US011630555B2

(12) United States Patent
Liu

(10) Patent No.: US 11,630,555 B2
(45) Date of Patent: Apr. 18, 2023

(54) CONTROL METHOD AND CONTROL SYSTEM FOR SMART TOOTHBRUSH

(71) Applicant: SHENZHEN YUNDING INFORMATION TECHNOLOGY CO., LTD., Guangdong (CN)

(72) Inventor: Bo Liu, Shenzhen (CN)

(73) Assignee: SHENZHEN YUNDING INFORMATION TECHNOLOGY CO., LTD., Guangdong (CN)

(*) Notice: Subject to any disclaimer, the term of this patent is extended or adjusted under 35 U.S.C. 154(b) by 797 days.

(21) Appl. No.: 16/608,188

(22) PCT Filed: Jul. 5, 2017

(86) PCT No.: PCT/CN2017/091885
§ 371 (c)(1),
(2) Date: Nov. 29, 2019

(87) PCT Pub. No.: WO2018/196160
PCT Pub. Date: Nov. 1, 2018

(65) Prior Publication Data
US 2021/0093428 A1 Apr. 1, 2021

(30) Foreign Application Priority Data
Apr. 25, 2017 (CN) .......................... 201710286631.8

(51) Int. Cl.
A61C 17/34 (2006.01)
G06F 3/0484 (2022.01)
(Continued)

(52) U.S. Cl.
CPC .......... *G06F 3/0484* (2013.01); *A61C 17/221* (2013.01); *G01B 11/00* (2013.01);
(Continued)

(58) Field of Classification Search
CPC ...... A61C 17/221; A61C 17/34; G06F 3/0484
See application file for complete search history.

(56) References Cited

U.S. PATENT DOCUMENTS

| 2012/0171657 | A1 | 7/2012 | Ortins et al. |
| 2016/0296163 | A1 | 10/2016 | Chaudhry et al. |
| 2016/0367188 | A1* | 12/2016 | Malik .................... G16H 40/67 |

FOREIGN PATENT DOCUMENTS

| CN | 203943758 | 11/2014 |
| CN | 204048584 | 12/2014 |

(Continued)

OTHER PUBLICATIONS

"International Search Report (Form PCT/ISA/210)", dated Jan. 25, 2018, with English translation thereof, pp. 1-4.
(Continued)

*Primary Examiner* — Michael D Jennings
(74) *Attorney, Agent, or Firm* — JCIPRNET

(57) ABSTRACT

A control method and control system for a smart toothbrush. An App terminal reads the tooth brushing scheme of the cloud. The App terminal recommends a matched tooth brushing scheme according to personal information of a user. Finally, based on the user's selection, the recommended tooth brushing scheme is pushed to the smart toothbrush for parameter adjustment. Alternatively, a customized or re-selected tooth brushing scheme is pushed to the smart toothbrush for parameter adjustment. The control method and control system for the smart toothbrush meet many tooth brushing needs for different people, improving the applicability of the smart toothbrushes.

16 Claims, 3 Drawing Sheets

(51) Int. Cl.
    *A61C 17/22*     (2006.01)
    *G01B 11/00*     (2006.01)
    *G06N 7/00*     (2023.01)
    *A46B 15/00*     (2006.01)

(52) U.S. Cl.
    CPC ............ *G06N 7/00* (2013.01); *A46B 15/0008* (2013.01); *A61C 17/3481* (2013.01)

(56) References Cited

FOREIGN PATENT DOCUMENTS

| | | |
|---|---|---|
| CN | 104273932 | 1/2015 |
| CN | 104783487 | 7/2015 |
| CN | 104886921 | 9/2015 |
| CN | 105012035 | 11/2015 |
| CN | 105029891 | 11/2015 |
| CN | 105411165 | 3/2016 |
| CN | 205267375 | 6/2016 |
| CN | 205514999 | 8/2016 |
| CN | 205597440 | 9/2016 |
| JP | 2012524643 | 10/2012 |
| KR | 20070054226 | 5/2007 |
| RU | 2518532 | 6/2014 |
| RU | 2015129780 | 1/2017 |
| WO | 2014016718 | 1/2014 |
| WO | 2014097022 | 6/2014 |
| WO | 2016020780 | 2/2016 |
| WO | 2016082784 | 6/2016 |

OTHER PUBLICATIONS

"Search Report of Europe Counterpart Application", dated Dec. 11, 2020, p. 1-p. 8.
"Office Action of Russia Counterpart Application", dated Dec. 1, 2020, p. 1-p. 6.
Office Action of Korea Counterpart Application, with English translation thereof, dated Jul. 19, 2021, pp. 1-11.
Office Action of Korea Counterpart Application, with English translation thereof, dated Jan. 18, 2022, pp. 1-6.
Office Action of Japan Counterpart Application, with English translation thereof, dated Jan. 5, 2021, pp. 1-6.

* cited by examiner

CONTROL METHOD AND CONTROL SYSTEM FOR SMART TOOTHBRUSH

CROSS-REFERENCE TO RELATED APPLICATION

This application is a 371 of international application of PCT application serial no. PCT/CN2017/091885, filed on Jul. 5, 2017, which claims the priority benefit of China application no. 201710286631.8, filed on Apr. 25, 2017. The entirety of each of the above mentioned patent applications is hereby incorporated by reference herein and made a part of this specification.

TECHNICAL FIELD

The present invention relates to the technical field of intelligent health, especially to a control method and control system for a smart toothbrush.

BACKGROUND

Smart toothbrushes may help people develop a good tooth brushing habit. Since effective tooth brushing habits vary from different ages, genders and areas, traditional tooth brushing schemes are limited, which cannot meet brushing requirements for all users.

SUMMARY OF THE INVENTION

The main purpose of the present invention is to provide a control method for a smart toothbrush, which aims to meet the needs of different users for tooth brushing under different circumstances, improving applicability of the smart toothbrush.

To achieve the above-mentioned purposes, the control method for the smart toothbrush provided by the present invention includes the following steps:

Reading, by an application (App) terminal, a tooth brushing scheme in a cloud;

Obtaining personal information of a user, and recommending a matched tooth brushing scheme according to the personal information;

Pushing the tooth brushing scheme, which is recommended, to the smart toothbrush for parameter adjustment, alternatively, pushing a tooth brushing scheme customized or re-selected by the user to the smart toothbrush for parameter adjustment according to an obtained user selection operation.

Furthermore, the pushing the tooth brushing scheme, which is recommended, to the smart toothbrush for parameter adjustment, alternatively, pushing the tooth brushing scheme customized or re-selected by the user to the smart toothbrush for parameter adjustment according to the obtained user selection operation comprises specifically:

According to the obtained user selection operation, determining whether the tooth brushing scheme recommended by the App terminal is accepted;

If yes, pushing the tooth brushing scheme which is recommended by the App terminal to the smart toothbrush for parameter adjustment;

If not, pushing the tooth brushing scheme customized or re-selected by the user to the smart toothbrush for operational parameter adjustment.

Furthermore, pushing the tooth brushing scheme customized or re-selected by the user to the smart toothbrush for the operational parameter adjustment comprises specifically:

If the tooth brushing scheme which is recommended is not accepted, displaying all tooth brushing schemes on a display interface of the App terminal;

If a tooth brushing scheme required by the user exists among all the tooth brushing schemes, pushing, by the App terminal, the tooth brushing scheme re-selected by the user to the smart toothbrush for the operational parameter adjustment;

If the tooth brushing scheme required by the user does not exist among all the tooth brushing schemes, pushing, by the App terminal, the tooth brushing scheme customized by the user to the smart toothbrush for the operational parameter adjustment.

Furthermore, the smart toothbrush comprises a toothbrush firmware; the pushing the tooth brushing scheme customized by the user to the smart toothbrush for the operational parameter adjustment comprises specifically:

Obtaining a click operation on a custom option on the display interface, and popping up a customized scheme interface;

Obtaining selection operations of tooth brushing step, vibration frequency, vibration duration and vibration mode which are executed on the customized scheme interface, and generating a customized tooth brushing scheme in a preset format;

Sending the customized tooth brushing scheme to the cloud for storage, and displaying the customized tooth brushing scheme on the display interface;

After obtaining a confirmation operation performed by the user, pushing the customized tooth brushing scheme to the toothbrush firmware to adjust the tooth brushing step, the vibration frequency, the vibration duration, and the vibration mode of the smart toothbrush.

Furthermore, the smart toothbrush comprises a toothbrush firmware, and the pushing the tooth brushing scheme to the smart toothbrush for the operational parameter adjustment comprises specifically:

Receiving the tooth brushing scheme pushed by the App terminal and storing the tooth brushing scheme in the toothbrush firmware;

Adjusting the vibration mode, the vibration frequency, and the vibration duration of the smart toothbrush by running the toothbrush firmware.

Furthermore, prior to reading, by the App terminal, the tooth brushing scheme in the cloud:

Recording, by the cloud, all tooth brushing schemes and matching appropriately based on different groups of people.

Furthermore, obtaining the personal information of the user, and recommending the matched tooth brushing scheme according to the personal information comprises specifically:

Obtaining the personal information of the user from registration information of an App account or account information of a third-party application associated with the App account;

Determining which group the user belongs to according to the personal information;

Recommending the matched tooth brushing scheme according to the group the user belongs to;

Displaying the tooth brushing scheme which is recommended on the display interface of the App terminal.

Furthermore, obtaining the personal information of the user, and recommending the matched tooth brushing scheme according to the personal information comprises specifically:

Obtaining, by the App terminal, the personal information of the user from a personal identification card;

Determining which group the user belongs to according to the personal information;

Recommending the matched tooth brushing scheme according to the group the user belongs to;

Displaying the tooth brushing scheme which is recommended on the display interface of the App terminal.

The present invention further provides a control system for a smart toothbrush which comprises an App terminal, a cloud and a smart toothbrush which are respectively connected to the App terminal, the App terminal comprising a first storage, a first processor, and a first control program stored in the first storage and executed by the first processor, wherein the first processor executes the first control program to carry out steps of the control method mentioned above.

Furthermore, the smart toothbrush comprises a second storage, a second processor, and a second control program stored in the second storage and executed by the second processor, wherein the second processor executes the second control program for:

Receiving the tooth brushing scheme pushed by the App terminal and storing the tooth brushing scheme in the toothbrush firmware;

Adjusting vibration mode, vibration frequency, and vibration duration of the smart toothbrush by running the toothbrush firmware.

In the control method for the smart toothbrush, the app terminal reads the tooth brushing scheme in the cloud; the personal information of the user is obtained, and the matched tooth brushing scheme is recommended according to the personal information; the tooth brushing scheme, which is recommended, is pushed to the smart toothbrush for parameter adjustment, alternatively, the tooth brushing scheme customized or re-selected by the user is pushed to the smart toothbrush for parameter adjustment according to an obtained user selection operation, which meets the needs of different users for tooth brushing under different circumstances and improves applicability of the smart toothbrush.

BRIEF DESCRIPTION OF THE ACCOMPANYING DRAWINGS

In order to clearly illustrate the embodiments of the present invention or the technical schemes in the existing technology, the drawings required for the embodiments of the present invention or description of the existing technology will be briefly introduced. Obviously, the drawings in the following description are only some embodiments of the present invention. For those ordinarily skilled in the art, other drawings may be obtained in the light of the structures illustrated in the drawings without paying creative works.

The purpose, functional features, and advantages of the present invention will be further described in accompany with the embodiments and attached drawings.

DETAILED DESCRIPTION OF ILLUSTRATED EMBODIMENTS

It is to be understood that the specific embodiments described herein are merely to explain but not to limit the present invention.

The present invention provides a control method for a smart toothbrush.

Figure 1:
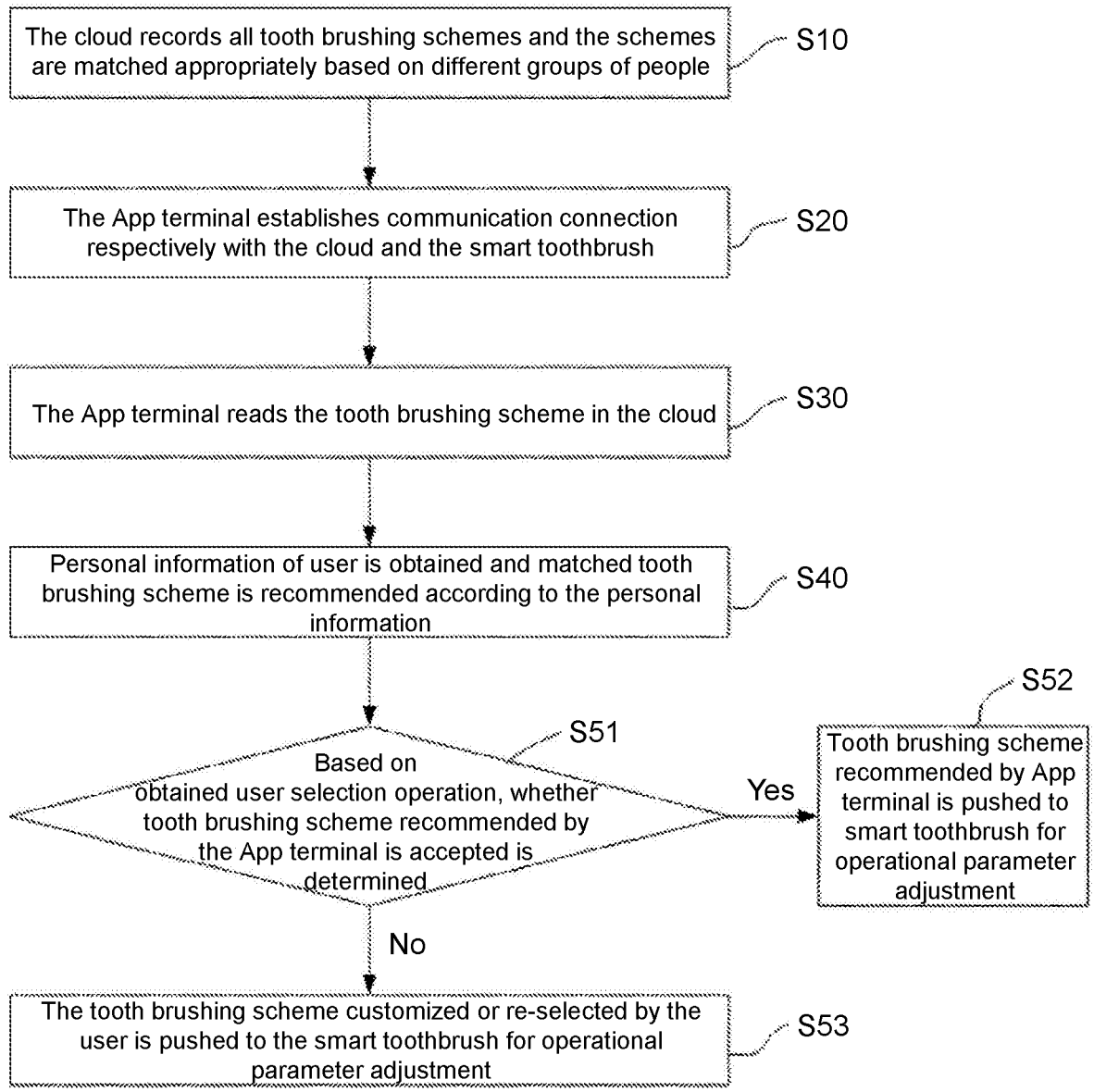
FIG. 1 is a flow chart of a control method for a smart toothbrush according to an embodiment of the present embodiment.

Referring to FIG. 1, a flow chart of a control method for a smart toothbrush is provided according to the present invention is provided.

In this embodiment, the control method includes:

S10: The cloud records all tooth brushing schemes and the schemes are matched appropriately based on different groups of people;

S20: The App terminal establishes communication connection respectively with the cloud and the smart toothbrush;

S30: The App terminal reads the tooth brushing scheme in the cloud;

S40: The personal information of the user is obtained, and the matched tooth brushing scheme is recommended according to the personal information;

S51: According to the obtained user selection operation, whether the tooth brushing scheme recommended by the App terminal is accepted is determined.

If yes, S52 is executed.

S52: The tooth brushing scheme which is recommended by the App terminal is pushed to the smart toothbrush for operational parameter adjustment;

If not, S53 is executed.

S53: The tooth brushing scheme customized or re-selected by the user is pushed to the smart toothbrush for operational parameter adjustment.

In this embodiment, the control method for this smart toothbrush is mainly used to meet different tooth brushing needs for more people. The control method firstly utilizes the cloud to configure the tooth brushing scheme. When the tooth brushing scheme configured by the cloud cannot meet the user's needs, the user may be authorized to customize the tooth brushing scheme, so that the tooth brushing scheme may be configured flexibly according to actual needs of the user. The configured tooth brushing scheme will be pushed to the smart toothbrush for parameter adjustment, and then the configured tooth brushing scheme may operate.

The tooth brushing scheme of the embodiment is recorded by the cloud, and is classified in the process of specific operation by the background server according to different schemes, including brushing step, vibration frequency, vibration duration, vibration mode, and application prompt. Then, the tooth brushing scheme may be classified suitably based on different applicable groups. For example, a whitening tooth brushing scheme uses high-frequency sound waves with a vibration duration of 2 minutes and 10 seconds, an usage period of morning, noon and night an application prompt of "Used in conjunction with dental floss with better effect". Brushing steps includes a cleaning mode, a deep cleaning mode, a polishing mode and a massage mode, wherein the cleaning mode about lasts for 40 s; the deep cleaning mode last for 55 s; the polishing mode lasts for 15 s and the massage mode lasts for 20 s. The above tooth brushing scheme may be re-adjusted according to different applicable groups, so that each tooth brushing scheme could be matched with one group of people. Each type of tooth brushing scheme and the match group of people may be entered into the cloud. The groups of people are mainly classified by age, gender and type of teeth.

After all the tooth brushing schemes and the applicable groups of people matched by each tooth brushing scheme are entered by the cloud, the App terminal establishes a communication connection with the cloud and the smart toothbrush respectively. Generally, the connection between the App terminal and the cloud is WiFi connection. In an alternative embodiment, the connection may be performed through a data cable, and the data is transmitted between the App terminal and the cloud through HTTP protocol, which means that uploaded data is inevitably compressed or packaged in HTTP format when the App terminal uploads data to the cloud. Similarly, when the data is transmitted to the App terminal form the cloud, the corresponding data is also compressed or packaged in the HTTP format. The communication and data transmission between the App terminal and the smart toothbrush is performed by means of Bluetooth, WiFi, or zigbee. Due to low power consumption performance of the Bluetooth, Bluetooth mode is preferable to realize the data interaction between the App terminal and the smart toothbrush in this control method of this embodiment.

When the user needs to brush his/her teeth, the App terminal may be used to adjust the tooth brushing parameters of the smart toothbrush for choosing a suitable tooth brushing scheme. At this time, the App terminal reads the tooth brushing scheme in the cloud through the communication connection established with the cloud. All the tooth brushing schemes will be shown on the display interface of the App terminal. Then, the App terminal automatically obtains the user's personal information and analyzes the obtained personal information. Firstly, the users are divided into two groups according to gender. Secondly, the male and female groups are further divided according to age, for example, 0-10 year-olds are divided into children group; 11-16 year-olds are divided into juvenile group; 17-30 year-olds are divided into youth group; 31-60 year-olds are divided into middle-aged group, and 60 year-olds or older are divided into old age group. Finally, a matched tooth brushing scheme is recommended according to the group to which the user belongs.

The App terminal displays the recommended tooth brushing scheme on the top layer of the display interface. The user then needs to select whether to accept the tooth brushing scheme recommended by the App terminal. The top layer of the display interface includes not only the name, brief description, and function of the recommended tooth brushing scheme, but also an option called "Use Now". The user can click the "Use Now" option to confirm the recommended tooth brushing scheme, or select an upper left return icon to return to the previous interface, which displays all the tooth brushing schemes read from the cloud. That is to say, after the click operation performed on the display interface is obtained by the App terminal, further determination shall be made on the click operation to determine whether the tooth brushing scheme recommended by the App terminal is accepted. If the recommended tooth brushing scheme is accepted, the App terminal will push the recommended tooth brushing scheme to the smart toothbrush through Bluetooth and modify the inherent tooth brushing scheme of the smart toothbrush, which means that the operational parameters of the smart toothbrush are adjusted to perform the tooth brushing scheme recommended by the App terminal; if the recommended tooth brushing scheme is not accepted, the user needs to re-select the required tooth brushing scheme from all the tooth brushing schemes read by the App terminal. Alternatively, when no tooth brushing scheme required by the user exists in the entire tooth brushing scheme, the user may customize the required tooth brushing scheme. Then the user's re-selected or re-defined tooth brushing scheme would be pushed to the smart toothbrush through the App terminal to rewrite the inherent tooth brushing scheme of the smart toothbrush. In other words, the operational parameters of the smart toothbrush is adjusted to make it the smart toothbrush perform the customized or re-selected tooth brushing scheme.

In the control method for the smart toothbrush in the present invention, the App terminal reads the tooth brushing scheme in the cloud, then recommends a matched tooth brushing scheme according to the user's personal information, and finally pushes the recommended tooth brushing scheme to the smart toothbrush according to the user's selection to carry on parameter adjustment; alternatively, pushes the customized or re-selected tooth brushing scheme to the smart toothbrush for parameter adjustment. By adding the customized tooth brushing schemes, different brushing needs for more people are met, and the applicability of the smart toothbrush is improved.

Figure 2:
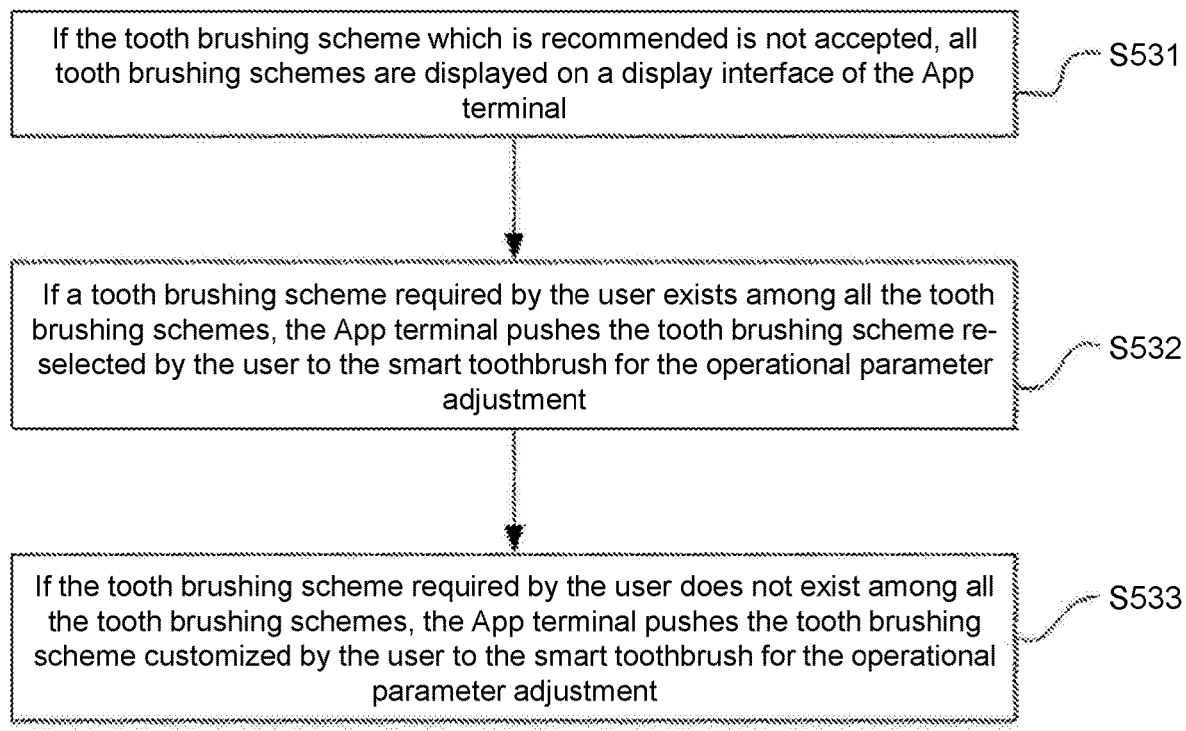
FIG. 2 is a specific flow chart of step S53 in FIG. 1.

Referring to FIG. 2, based on the control method for the smart toothbrush above. The S53 specifically includes:

S531: If the tooth brushing scheme which is recommended is not accepted, all tooth brushing schemes are displayed on a display interface of the App terminal;

S532: If a tooth brushing scheme required by the user exists among all the tooth brushing schemes, the App terminal pushes the tooth brushing scheme re-selected by the user to the smart toothbrush for the operational parameter adjustment;

S533: If the tooth brushing scheme required by the user does not exist among all the tooth brushing schemes, the App terminal pushes the tooth brushing scheme customized by the user to the smart toothbrush for the operational parameter adjustment.

In this embodiment, when the user does not confirm the tooth brushing scheme recommended by the App terminal, which means that the tooth brushing scheme recommended by the App terminal is not accepted, the App terminal shows all the tooth brushing schemes read from the cloud on its display interface, and then the user may re-select the tooth brushing scheme in accordance with his/her own requirement from all the tooth brushing schemes. When a tooth brushing scheme actually needed by the user exists in all the tooth brushing schemes, the App terminal could determine user's re-selected tooth brushing scheme according to the obtained click operation on the display interface and then push it to the smart toothbrush to modify the inherent tooth brushing scheme, in other words, to adjust the operational parameters of the smart toothbrush to perform the tooth brushing scheme re-selected by user. When there is no tooth brushing scheme actually needed by the user in all the tooth brushing schemes, the App terminal would obtain the click operation on customized option, which is performed by the user on the display interface, and accept the tooth brushing scheme generated by the user after the customized selection, and then push it to the smart toothbrush for modifying the inherent tooth brushing scheme of the smart toothbrush, in other words, to adjust the operational parameters of the smart toothbrush to perform a customized tooth brushing scheme, By adding the customized tooth brushing schemes, different brushing needs for more people are met, and the applicability of the smart toothbrush is improved.

Figure 3:
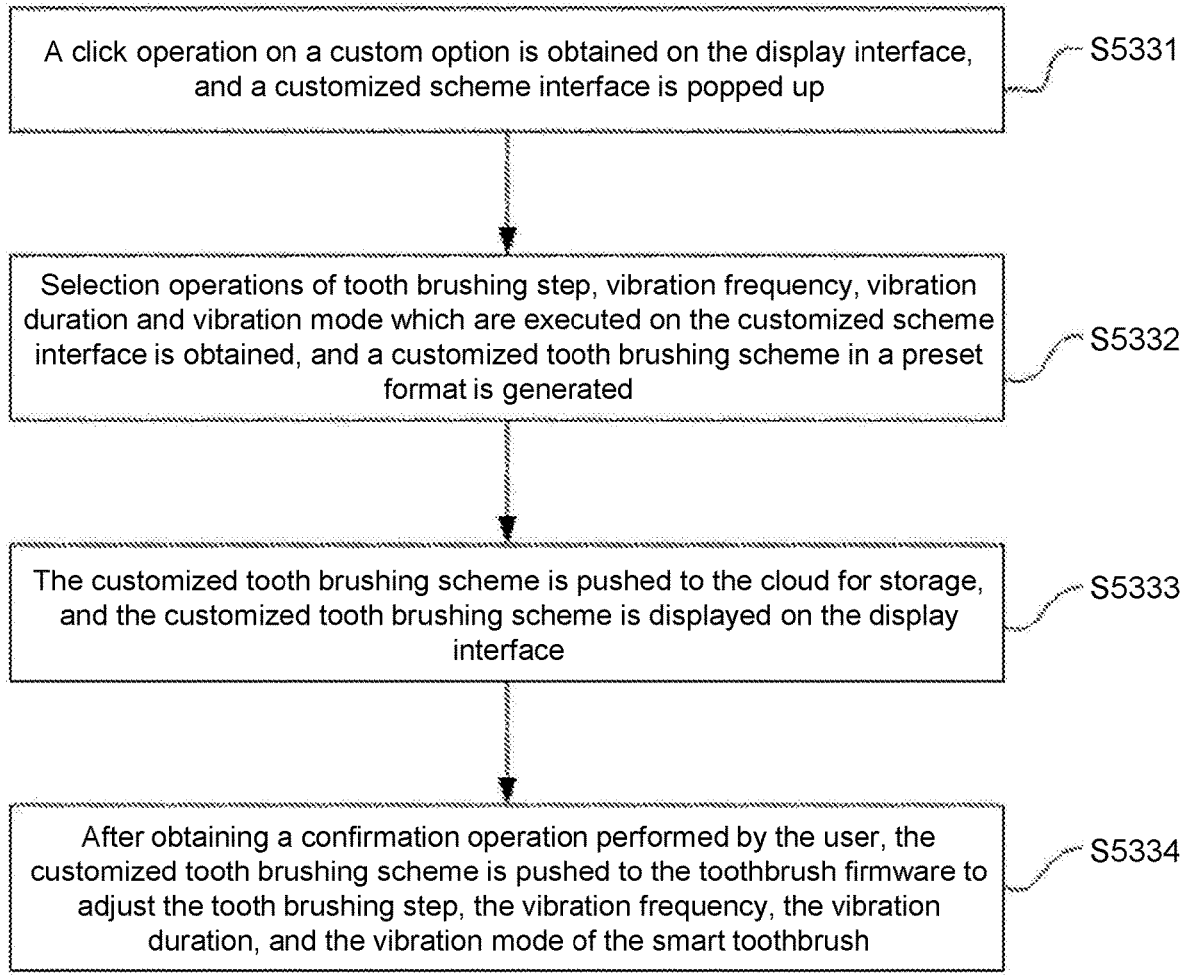
FIG. 3 is a specific flow chart of step S533 in FIG. 2.

Referring to FIG. 3, based on the control method for the smart toothbrush according to the above embodiment, the smart toothbrush includes a toothbrush firmware. The S533 specially includes:

S5331: A click operation on a custom option is obtained on the display interface, and a customized scheme interface is popped up;

S5332: Selection operations of tooth brushing step, vibration frequency, vibration duration and vibration mode which are executed on the customized scheme interface is obtained, and a customized tooth brushing scheme in a preset format is generated;

S5333: The customized tooth brushing scheme is pushed to the cloud for storage, and the customized tooth brushing scheme is displayed on the display interface;

S5334: After obtaining a confirmation operation performed by the user, the customized tooth brushing scheme is pushed to the toothbrush firmware to adjust the tooth brushing step, the vibration frequency, the vibration duration, and the vibration mode of the smart toothbrush.

When the existing tooth brushing schemes cannot meet the actual needs of the user, the user may select a customized scheme option according to his/her actual needs. When the App terminal obtains the click operation on the custom option performed by the user on the display interface, an interface of customized scheme will pop up on its display interface, which includes a name option of the customized scheme, a scheme icon option, a customized step option, a scheme deletion option, and a save option. Each customized step includes a selection of brushing time and vibration frequency, so that the user may make a selection according to his/her actual needs. When the user makes customized selections according to his/her actual needs, the brushing step, the vibration frequency, the vibration duration and the vibration mode are respectively selected, and the user may click the save options on the customized interface to generate the customized tooth brushing scheme in the preset format. Then, the customized tooth brushing scheme is compressed or packaged by the HTTP protocol and uploaded to the cloud for storage, saving the memory of the App terminal and the smart toothbrush. The customized tooth brushing scheme is also displayed on the display interface of the App terminal, so that the user could perform the confirmation operation on this customized tooth brushing scheme. When the confirmation operation performed by user is obtained, the customized scheme is pushed to the toothbrush firmware of the smart toothbrush via Bluetooth, and the customized scheme is saved in the toothbrush firmware so that the smart toothbrush can still be independently activated in case of being disconnected from the App terminal. The brushing step, vibration frequency, vibration duration, and vibration mode of the smart toothbrush may be adjusted through running the toothbrush firmware to meet the actual brushing needs, improving the applicability of the smart toothbrush.

Furthermore, the smart toothbrush comprises a toothbrush firmware, and the pushing the tooth brushing scheme to the smart toothbrush for the operational parameter adjustment comprises specifically:

The tooth brushing scheme pushed by the App terminal is received and the tooth brushing scheme is stored in the toothbrush firmware;

The vibration mode, the vibration frequency, and the vibration duration of the smart toothbrush is adjusted by running the toothbrush firmware.

In this embodiment, when the App terminal pushes the recommended tooth brushing scheme or the user re-selected tooth brushing scheme or the customized tooth brushing scheme to the smart toothbrush, the smart toothbrush stores the received tooth brushing scheme in the toothbrush firmware. So, the smart toothbrush can still implement the tooth brushing scheme recommended by the App terminal, or the user's re-selected tooth brushing scheme, or the customized tooth brushing scheme even after the communication between the smart toothbrush and the App terminal being disconnected. When it needs to use the new tooth brushing scheme to brush, the tooth brushing scheme inherent to the smart toothbrush may be modified through running the toothbrush firmware, which means that the vibration mode, vibration frequency, and vibration duration of the original tooth brushing scheme are adjusted to meet the actual needs of the user, improving the applicability of the smart toothbrush.

Furthermore, obtaining the personal information of the user, and recommending the matched tooth brushing scheme according to the personal information includes specifically:

Obtaining the personal information of the user from registration information of an App account or account information of a third-party application associated with the App account;

It is determined which group the user belongs to according to the personal information;

The matched tooth brushing scheme is recommended according to the group the user belongs to;

The tooth brushing scheme which is recommended is displayed on the display interface of the App terminal.

In this embodiment, the App terminal obtains the user's personal information in many ways, like from the registration information of the App account. The App account may require the user to register the real name in order to obtain the user's personal information, such as name, age, gender, and so on. In other embodiments, the user's personal information may also be obtained through the account information of the third-party application associated with the App account. Taking logging in an App for example, one can log in through the authorization of the third-party application, or bind the App account to the account information of the third-party application. For example, the App account is bound to the user's Weibo account or WeChat account. Then the user's name, age, gender, living habit, and other personal information may be obtained through access to the user's Weibo account information or WeChat account information. Alternatively, the App terminal may scan the user's personal identification card to read the user's age, gender, and other personal information, and then determine which group the user belongs to according to the obtained personal information, so that the all the tooth brushing schemes could be corresponded to the groups of people. Then the tooth brushing scheme may be recommended to the user according to the group the user belongs to. And, the recommended tooth brushing scheme is shown on the display interface of the App terminal for the user to select.

The present invention further provides a control system for the smart toothbrush.

The control system includes an App terminal, a cloud and a smart toothbrush which are respectively connected to the App terminal, the App terminal comprising a first storage, a first processor, and a first control program stored in the first storage and executed by the first processor, wherein the first processor executes the first control program for:

Reading, by an App terminal, a tooth brushing scheme in a cloud;

Obtaining personal information of a user, and recommending a matched tooth brushing scheme according to the personal information;

Pushing the tooth brushing scheme, which is recommended, to the smart toothbrush for parameter adjustment, alternatively, pushing a tooth brushing scheme customized or re-selected by the user to the smart toothbrush for parameter adjustment according to an obtained user selection operation.

In the control system for the smart toothbrush in the present invention, the tooth brushing scheme on the cloud is read by the App terminal, then a matched tooth brushing scheme is recommended according to the user's personal information, and finally, the recommended tooth brushing scheme is pushed to the smart toothbrush based on the user's selection of parameter adjustment. Alternatively, the customized or re-selected tooth brushing scheme is pushed to the smart toothbrush for parameter adjustment. By adding the customized tooth brushing scheme, different brushing needs for more people is met, and the applicability of the smart toothbrush is improved.

Furthermore, the first processor further executes the first control program for:

According to the obtained user selection operation, determining whether the tooth brushing scheme recommended by the App terminal is accepted;

If yes, pushing the tooth brushing scheme which is recommended by the App terminal to the smart toothbrush for operational parameter adjustment;

If not, pushing the tooth brushing scheme customized or re-selected by the user to the smart toothbrush for operational parameter adjustment.

Furthermore, the first processor further executes the first control program for:

If the tooth brushing scheme which is recommended is not accepted, displaying all tooth brushing schemes on a display interface of the App terminal;

If a tooth brushing scheme required by the user exists among all the tooth brushing schemes, pushing, by the App terminal, the tooth brushing scheme re-selected by the user to the smart toothbrush for the operational parameter adjustment;

If the tooth brushing scheme required by the user does not exist among all the tooth brushing schemes, pushing, by the App terminal, the tooth brushing scheme customized by the user to the smart toothbrush for the operational parameter adjustment.

Furthermore, the first processor further executes the first control program for:

Obtaining a click operation of the custom option on the display interface, and popping up a customized scheme interface;

Obtaining selection operations of tooth brushing step, vibration frequency, vibration duration and vibration mode which are executed on the customized scheme interface, and generating a customized tooth brushing scheme in a preset format;

Sending the customized tooth brushing scheme to the cloud for storage, and displaying the customized tooth brushing scheme on the display interface;

After obtaining a confirmation operation performed by the user, pushing the customized tooth brushing scheme to the toothbrush firmware to adjust the tooth brushing step, the vibration frequency, the vibration duration, and the vibration mode of the smart toothbrush.

Furthermore, the first processor further executes the first control program for:

Obtaining the personal information of the user from registration information of an App account or account information of a third-party application associated with the App account;

Determining which group the user belongs to according to the personal information;

Recommending the matched tooth brushing scheme according to the group the user belongs to;

Displaying the tooth brushing scheme which is recommended on the display interface of the App terminal.

Furthermore, the first processor further executes the first control program for:

Obtaining, by the App terminal, the personal information of the user from a personal identification card;

Determining which group the user belongs to according to the personal information;

Recommending the matched tooth brushing scheme according to the group the user belongs to;

Displaying the tooth brushing scheme which is recommended on the display interface of the App terminal.

Furthermore, the smart toothbrush comprises a second storage, a second processor, and a second control program stored in the second storage and executed by the second processor, wherein the second processor executes the second control program for:

Receiving the tooth brushing scheme pushed by the App terminal and storing the tooth brushing scheme in the toothbrush firmware;

Adjusting vibration mode, vibration frequency, and vibration duration of the smart toothbrush by running the toothbrush firmware.

The contents above are only preferable embodiments of the present invention, but not intended to limit the scope of the present invention. Any equivalent structure or equivalent process made, or directly or indirectly application to other associated technical areas in the light of the present specification and the drawings all fall within the scope of the present invention.

What is claimed is:

1. A control method for a smart toothbrush, comprising:
   reading, by an application (App) terminal, a tooth brushing scheme in a cloud;
   obtaining personal information of a user, and recommending a matched tooth brushing scheme according to the personal information;
   pushing the tooth brushing scheme, which is recommended, to the smart toothbrush for parameter adjustment, alternatively, pushing a tooth brushing scheme customized or re-selected by the user to the smart toothbrush for parameter adjustment according to an obtained user selection operation,
   wherein pushing the tooth brushing scheme customized or re-selected by the user to the smart toothbrush for the operational parameter adjustment comprises:
   displaying all tooth brushing schemes on a display interface of the App terminal;
   if a tooth brushing scheme required by the user exists among all the tooth brushing schemes, pushing, by the App terminal, the tooth brushing scheme re-selected by the user to the smart toothbrush for the operational parameter adjustment;
   if the tooth brushing scheme required by the user does not exist among all the tooth brushing schemes, pushing, by the App terminal, the tooth brushing scheme customized by the user to the smart toothbrush for the operational parameter adjustment.

2. The control method for the smart toothbrush of claim 1, wherein pushing the tooth brushing scheme, which is recommended, to the smart toothbrush for parameter adjustment, alternatively, pushing the tooth brushing scheme customized or re-selected by the user to the smart toothbrush for parameter adjustment according to the obtained user selection operation comprises:
   according to the obtained user selection operation, determining whether the tooth brushing scheme recommended by the App terminal is accepted;
   if yes, pushing the tooth brushing scheme which is recommended by the App terminal to the smart toothbrush for parameter adjustment;

if not, pushing the tooth brushing scheme customized or re-selected by the user to the smart toothbrush for operational parameter adjustment.

3. The control method for the smart toothbrush of claim 2, wherein pushing the tooth brushing scheme customized or re-selected by the user to the smart toothbrush for the operational parameter adjustment comprises:
if the tooth brushing scheme which is recommended is not accepted, displaying all tooth brushing schemes on the display interface of the App terminal.

4. The control method for the smart toothbrush of claim 3, wherein the smart toothbrush comprises a toothbrush firmware; the pushing the tooth brushing scheme customized by the user to the smart toothbrush for the operational parameter adjustment comprises:
obtaining a click operation on a custom option on the display interface, and popping up a customized scheme interface;
obtaining selection operations of tooth brushing step, vibration frequency, vibration duration and vibration mode which are executed on the customized scheme interface, and generating a customized tooth brushing scheme in a preset format;
pushing the customized tooth brushing scheme to the cloud for storage, and displaying the customized tooth brushing scheme on the display interface;
after obtaining a confirmation operation performed by the user, pushing the customized tooth brushing scheme to the toothbrush firmware to adjust the tooth brushing step, the vibration frequency, the vibration duration, and the vibration mode of the smart toothbrush.

5. The control method for the smart toothbrush of claim 3, wherein the smart toothbrush includes a toothbrush firmware, and the pushing the tooth brushing scheme to the smart toothbrush for the operational parameter adjustment comprises:
receiving the tooth brushing scheme pushed by the App terminal and storing the tooth brushing scheme in the toothbrush firmware;
adjusting the vibration mode, the vibration frequency, and the vibration duration of the smart toothbrush by running the toothbrush firmware.

6. The control method for the smart toothbrush of claim 2, wherein the smart toothbrush comprises a toothbrush firmware, and the pushing the tooth brushing scheme to the smart toothbrush for the operational parameter adjustment comprises:
receiving the tooth brushing scheme pushed by the App terminal and storing the tooth brushing scheme in the toothbrush firmware;
adjusting the vibration mode, the vibration frequency, and the vibration duration of the smart toothbrush by running the toothbrush firmware.

7. The control method for the smart toothbrush of claim 1, further comprising, prior to reading, by the App terminal, the tooth brushing scheme in the cloud:
recording, by the cloud, all tooth brushing schemes and matching appropriately based on different groups of people.

8. The control method for the smart toothbrush of claim 7, wherein obtaining the personal information of the user, and recommending the matched tooth brushing scheme according to the personal information comprises:
obtaining the personal information of the user from registration information of an App account or account information of a third-party application associated with the App account;
determining which group the user belongs to according to the personal information;
recommending the matched tooth brushing scheme according to the group the user belongs to;
displaying the tooth brushing scheme which is recommended on the display interface of the App terminal.

9. The control method for the smart toothbrush of claim 7, wherein obtaining the personal information of the user, and recommending the matched tooth brushing scheme according to the personal information comprises:
obtaining, by the App terminal, the personal information of the user from a personal identification card;
determining which group the user belongs to according to the personal information;
recommending the matched tooth brushing scheme according to the group the user belongs to;
displaying the tooth brushing scheme which is recommended on the display interface of the App terminal.

10. A control system for a smart toothbrush, comprising an application (App) terminal, a cloud and a smart toothbrush which are respectively connected to the App terminal, the App terminal comprising a first storage, a first processor, and a first control program stored in the first storage and executed by the first processor, wherein the first processor executes the first control program for:
reading, by an App terminal, a tooth brushing scheme in a cloud;
obtaining personal information of a user, and recommending a matched tooth brushing scheme according to the personal information;
pushing the tooth brushing scheme, which is recommended, to the smart toothbrush for parameter adjustment, alternatively, pushing a tooth brushing scheme customized or re-selected by the user to the smart toothbrush for parameter adjustment according to an obtained user selection operation,
wherein the first processor further executes the first control program for:
displaying all tooth brushing schemes on a display interface of the App terminal;
if a tooth brushing scheme required by the user exists among all the tooth brushing schemes, pushing, by the App terminal, the tooth brushing scheme re-selected by the user to the smart toothbrush for the operational parameter adjustment;
if the tooth brushing scheme required by the user does not exist among all the tooth brushing schemes, pushing, by the App terminal, the tooth brushing scheme customized by the user to the smart toothbrush for the operational parameter adjustment.

11. The control system for the smart toothbrush of claim 10, wherein the first processor further executes the first control program for:
according to the obtained user selection operation, determining whether the tooth brushing scheme recommended by the App terminal is accepted;
if yes, pushing the tooth brushing scheme which is recommended by the App terminal to the smart toothbrush for operational parameter adjustment;
if not, pushing the tooth brushing scheme customized or re-selected by the user to the smart toothbrush for operational parameter adjustment.

12. The control system for the smart toothbrush of claim 10, wherein the first processor further executes the first control program for:

if the tooth brushing scheme which is recommended is not accepted, displaying all tooth brushing schemes on the display interface of the App terminal.

13. The control system for the smart toothbrush of claim 12, wherein the first processor further executes the first control program for:
obtaining a click operation on a custom option on the display interface, and popping up a customized scheme interface;
obtaining selection operations of tooth brushing step, vibration frequency, vibration duration and vibration mode which are executed on the customized scheme interface, and generating a customized tooth brushing scheme in a preset format;
pushing the customized tooth brushing scheme to the cloud for storage, and displaying the customized tooth brushing scheme on the display interface;
after obtaining a confirmation operation performed by the user, pushing the customized tooth brushing scheme to the toothbrush firmware to adjust the tooth brushing step, the vibration frequency, the vibration duration, and the vibration mode of the smart toothbrush.

14. The control system for the smart toothbrush of claim 10, wherein the first processor further executes the first control program for:
obtaining the personal information of the user from registration information of an App account or account information of a third-party application associated with the App account;
determining which group the user belongs to according to the personal information;
recommending the matched tooth brushing scheme according to the group the user belongs to;
displaying the tooth brushing scheme which is recommended on the display interface of the App terminal.

15. The control system for the smart toothbrush of claim 10, wherein the first processor further executes the first control program for:
obtaining, by the App terminal, the personal information of the user from a personal identification card;
determining which group the user belongs to according to the personal information;
recommending the matched tooth brushing scheme according to the group the user belongs to;
displaying the tooth brushing scheme which is recommended on the display interface of the App terminal.

16. The control system for the smart toothbrush of claim 10, wherein the smart toothbrush comprises a second storage, a second processor, and a second control program stored in the second storage and executed by the second processor, wherein the second processor executes the second control program for:
receiving the tooth brushing scheme pushed by the App terminal and storing the tooth brushing scheme in the toothbrush firmware;
adjusting vibration mode, vibration frequency, and vibration duration of the smart toothbrush by running the toothbrush firmware.

* * * * *